US009994774B2

(12) United States Patent
Li et al.

(10) Patent No.: US 9,994,774 B2
(45) Date of Patent: Jun. 12, 2018

(54) METHOD OF AND SYSTEM FOR GRINDING PYROLYSIS OF PARTICULATE CARBONACEOUS FEEDSTOCK

(75) Inventors: Chun-Zhu Li, Cottesloe (AU); Xiaoshan Wang, Glen Waverley (AU); Hongwei Wu, Swanbourne (AU)

(73) Assignee: Curtin University of Technology (AU)

( * ) Notice: Subject to any disclaimer, the term of this patent is extended or adjusted under 35 U.S.C. 154(b) by 766 days.

(21) Appl. No.: 13/806,537

(22) PCT Filed: Jun. 21, 2011

(86) PCT No.: PCT/AU2011/000741
§ 371 (c)(1),
(2), (4) Date: Apr. 11, 2013

(87) PCT Pub. No.: WO2011/160163
PCT Pub. Date: Dec. 29, 2011

(65) Prior Publication Data
US 2013/0199919 A1  Aug. 8, 2013

(30) Foreign Application Priority Data

Jun. 22, 2010  (AU) ................................ 2010902743

(51) Int. Cl.
*C10B 49/16* (2006.01)
*C10B 53/02* (2006.01)
(Continued)

(52) U.S. Cl.
CPC ............. *C10B 37/00* (2013.01); *C10B 47/30* (2013.01); *C10B 49/16* (2013.01); *C10B 53/02* (2013.01);
(Continued)

(58) Field of Classification Search
CPC ......... C10B 49/02; C10B 49/04; C10B 49/06; C10B 49/08; C10B 49/10; C10B 49/12;
(Continued)

(56) References Cited

U.S. PATENT DOCUMENTS 1,712,082 A * 5/1929 Koppers ......................... 201/12
2,420,376 A * 5/1947 Johansson ....................... 201/12
(Continued)

FOREIGN PATENT DOCUMENTS

CA           1334129      1/1995
EP           001200057    12/1980
(Continued)

OTHER PUBLICATIONS

Richard G. Sherritt, Jamal Chaouki, Anil K. Mehrotra, Leo A. Behie, "Axial dispersion in the three-dimensional mixing of particles in a rotating drum reactor", 2003, Chemical Engineering Science 58, pp. 401-415.*
(Continued)

*Primary Examiner* — Johnathan Miller
*Assistant Examiner* — Jonathan Luke Pilcher
(74) *Attorney, Agent, or Firm* — Perkins Coie LLP (57) ABSTRACT

A pyrolysis plant 20 comprises a grinding pyrolyzer 22, being a machine or apparatus in which both particle size reduction and pyrolysis occur simultaneously. Plant 20 also comprises a bin (hopper) 30 for holding wet particulate biomass feedstock. Chute 32 leads from the bin 30 to a biomass dryer 34 which reduces moisture content of the feedstock as low as possible, e.g., to below about 10. Dried feedstock is conveyed from dryer 34 via line 36 to a dried biomass feedstock hopper 38. Dried feedstock is fed from hopper 38 into a chute 40 which leads to an inlet trunnion 42 of grinding pyrolyzer 22. A discharge trunnion 44 of grinding pyrolyzer 22 leads to a char holder 60 for collecting char
(Continued)

particles and a condensation train 62 for condensing vapor generated by the pyrolysis to produce oil.

14 Claims, 4 Drawing Sheets

(51) Int. Cl.
| | |
|---|---|
| *C10B 1/10* | (2006.01) |
| *C10G 1/02* | (2006.01) |
| *C10B 37/00* | (2006.01) |
| *C10B 47/30* | (2006.01) |
| *C10B 57/10* | (2006.01) |
| *C10J 3/66* | (2006.01) |
| *F23G 5/027* | (2006.01) |
| *F23G 5/033* | (2006.01) |
| *F23G 5/20* | (2006.01) |

(52) U.S. Cl.
CPC ............... *C10B 57/10* (2013.01); *C10J 3/66* (2013.01); *F23G 5/027* (2013.01); *F23G 5/033* (2013.01); *F23G 5/20* (2013.01); *C10B 1/10* (2013.01); *C10G 1/02* (2013.01); *C10J 2300/0926* (2013.01); *F23G 2201/303* (2013.01); *F23G 2206/10* (2013.01); *Y02E 50/14* (2013.01); *Y02E 50/15* (2013.01); *Y02P 20/129* (2015.11); *Y02P 20/145* (2015.11)

(58) Field of Classification Search
CPC ......... C10B 47/30; C10B 47/32; C10B 53/02; C10B 49/16; C10B 49/18; C10B 1/10; F23G 2900/50801; C10G 1/02; C10L 9/083; Y10S 209/91
USPC ...................................... 201/10, 12; 241/170
See application file for complete search history.

(56) References Cited

U.S. PATENT DOCUMENTS

| | | | |
|---|---|---|---|
| 2,984,602 A | 5/1961 | Nevens et al. | |
| 3,034,979 A | 5/1962 | Nevens et al. | |
| 3,252,886 A | 5/1966 | Crawford | |
| 3,265,608 A | 8/1966 | Crawford | |
| 3,442,789 A | 5/1969 | Zimmerman | |
| 3,802,278 A * | 4/1974 | Loomans | 74/22 R |
| 3,925,190 A | 12/1975 | Whitcombe et al. | |
| 4,160,719 A * | 7/1979 | Pollock | 208/411 |
| 4,421,629 A * | 12/1983 | York et al. | 208/410 |
| 4,473,461 A * | 9/1984 | Thacker et al. | 208/425 |
| 2002/0029996 A1 | 3/2002 | Taciuk et al. | |
| 2010/0163395 A1* | 7/2010 | Henrich et al. | 201/2.5 |
| 2011/0057060 A1* | 3/2011 | Sprouse | 241/19 |
| 2011/0278149 A1* | 11/2011 | Hornung et al. | 201/12 |

FOREIGN PATENT DOCUMENTS

| | | | |
|---|---|---|---|
| GB | 268613 A * | 4/1927 | ............ C10B 47/30 |
| GB | 1 494 300 | 12/1977 | |
| JP | S59-12703 | 1/1984 | |
| JP | 62-243687 | 10/1987 | |
| JP | 2000-256008 | 9/2000 | |
| JP | 2001200093 | 7/2001 | |
| JP | 2007-303737 | 11/2007 | |
| JP | 2008-248161 | 10/2008 | |

OTHER PUBLICATIONS

International Search Report of PCT/AU2011/000741, dated Jul. 28, 2011, 4 pages.
Deniz, Cement and Concrete Research 34: 1365-1371 (2004).
Hayashi et al., Bulletin of the Faculty of Engineering, Hokkaido University 16: 105-112 (1957) (w/English Abstract).

* cited by examiner

METHOD OF AND SYSTEM FOR GRINDING PYROLYSIS OF PARTICULATE CARBONACEOUS FEEDSTOCK

CROSS-REFERENCE TO RELATED APPLICATIONS

This application is a 35 USC § 371 application of International Application No. PCT/AU2011/000741 filed Jun. 21, 2011, which claims priority to Australian Patent Application No. AU2010902743 filed Jun. 22, 2010, both of which are hereby incorporated by reference in their entirety.

FIELD OF THE INVENTION

The present invention relates to a method of and system for grinding pyrolysis of particulate carbonaceous feedstock such as, but not limited to, biomass or coal, particularly although not exclusively, for the production of one or more or a combination of: organic vapour, organic liquid (frequently in the form of oil) and char.

BACKGROUND OF THE INVENTION

Pyrolysis refers to the thermal decomposition of substances (feedstock) by heating in an oxygen deficient environment. Pyrolysis processes are generally divided into slow and fast pyrolysis according to the rate at which the feedstock is heated up. The traditional method of charcoal production is considered to be a slow pyrolysis process; it gives a liquid yield of typically around 30% (on dry mass basis). The fast pyrolysis of feedstock, on the other hand, gives a much higher liquid yield, widely reported to be above 60% (on dry mass basis). Therefore, the fast pyrolysis is advantageous over the slow pyrolysis when the targeted product from a carbonaceous feedstock is organic liquid Some of the fast pyrolysis technologies have reached demonstration scale (e.g., fluidized bed, vacuum). However, these technologies may have substantive technical and economical constraints at the commercial scale. For example, fluidized bed pyrolysers require the use of very fine particles, typically below 2 mm in diameter, but the preparation of such fine feedstock particles usually incurs high costs. Another serious deficiency of fluidized beds is that a very large volume of inert gas is required in order to fluidize the inert solids and to carry the resulted char out of the reactor. Many problems are associated with the use of a large volume of inert gas. For example, the partial pressure of the organic vapour may become extremely low due to dilution by the inert gas, which makes it difficult to quench and collect the organic components. In addition, a high velocity gas flow leads to the formation of aerosols which are extremely difficult to collect. Furthermore, non-condensable pyrolysis gas generated in this process is also diluted by the large volume of inert gas, which makes the direct utilization of this gas more problematic (e.g. in a combustion facility for generating heat). The continuous heating up (before entering the fluidized bed) and subsequent cooling down (to condense the organic vapour as bio-oil) of the inert gas greatly reduces the overall process efficiency.

SUMMARY OF THE INVENTION

One aspect of the invention provides a method of processing particulate carbonaceous feedstock comprising:
simultaneously subjecting feedstock to a particle size reduction process and pyrolysis.

The size reduction process may comprise either or both grinding and crushing the feedstock.

The size reduction process may comprise repeatedly contacting the feedstock with the one or more hard objects.

The contacting the feedstock with one or more hard objects may comprise impacting the feedstock with the one or more objects.

The one or more objects may be provided as grinding media composed of a plurality of separate and freely movable objects and repeatedly impacting the feedstock and composed of imparting momentum to the grinding media and causing the grinding media to impact the feedstock.

The method may comprise providing a vessel in which the size reduction process and the pyrolysis occur, and feeding the feedstock to the vessel, the vessel having a volume V and an inner diameter D.

The method may comprise providing the grinding media in the vessel and rotating the vessel.

The method may comprise providing the grinding media in an amount to occupy 10% to 50% of the volume V of the vessel.

The method may comprise rotating the vessel at a speed of 55% to 90% of a critical speed CS wherein:

$$CS = 42.3/D^{0.5} \text{ rpm.}$$

The method may comprise providing the objects as objects made of silica, pebble, or steel.

The method may comprise providing a steel, silica, or refractory lining on the inside of the vessel.

The method may comprise providing a continuous feed of grinding media through the vessel.

The pyrolysis may comprise transferring heat from the objects to the feedstock by conduction and convection.

The method may comprise heating the objects prior to the objects coming into contact with the feedstock.

The method may comprise using waste heat from a process of heating the objects to dry the feedstock prior to coming into contact with the objects.

The method may comprise heating the objects while the objects are in contact with the feedstock.

In one embodiment the pyrolysis comprises heating the vessel.

The method may comprise generating heat for the pyrolysis by burning non-condensable gases produced by pyrolysis of the feedstock.

The method may comprise conducting pyrolysis at a temperature to maximise the yield of oil. In one example this comprises conducting pyrolysis at a temperature between 350° C. and 650° C.

The method may comprise conducting pyrolysis at a temperature sufficient to cause torrefaction of the feedstock. In one example this comprises conducting pyrolysis at a temperature below 320° C.

In one embodiment the method comprises providing limited oxygen into the vessel to enable partial combustion of volatiles and/or char produced by pyrolysis of the feedstock to generate at least a portion of the heat for the pyrolysis of the feedstock.

In one embodiment the method comprises condensing organic vapour generated by the pyrolysis to form oil.

In one embodiment the method comprises condensing organic vapour generated by the pyrolysis on char generated by the pyrolysis to produce an oil/char mixture.

In an alternate embodiment the method comprises condensing organic vapour generated by the pyrolysis to produce oil and mixing char generated by the pyrolysis to produce an oil/char slurry.

In one embodiment the method comprises feeding products generated by the pyrolysis of the feedstock as a fuel to a combustion or gasification system. This embodiment may also comprise using combustion or gasification system as a source of heat for the pyrolysis.

In one embodiment the method comprises feeding products generated by the pyrolysis of the feedstock to a boiler or gasifier as a co-firing fuel.

A second aspect of the invention provides a plant for simultaneous grinding and pyrolysis of particulate carbonaecous feedstock comprising:

a machine capable of reducing particle size of the feedstock; and, a heat source capable of heating the feedstock while the machine operates to reduce the particle size of the feedstock to effect the pyrolysis of the feedstock.

The machine may comprise a grinding machine or a milling machine.

The machine may comprise grinding media in the form of a plurality of separate and freely movable objects and a vessel in which the grinding media and the feedstock come into contact with each other to effect particle size reduction of the feedstock.

The machine may operate by rotating the vessel to impart momentum to the grinding media and causing the grinding media to repeatedly impact the feedstock.

The plant may comprise a mechanism which circulates the grinding media through the vessel.

The grinding media, when in the vessel, may occupy 10% to 50% of the volume V of the vessel.

The vessel may be rotated at a speed of 55% to 90% of a critical speed CS wherein:

$$CS = 42.3/D^{0.5} \text{ rpm,}$$

where D is the internal diameter of the vessel in meters.

The heat source may be arranged to heat the grinding media prior to the grinding media contacting the feedstock.

Alternately or additionally the heat source may operate to heat the vessel.

The heat source may comprise a burner and a gas feed system to feed the non-condensed gas and vapour from the pyrolysis of the feedstock to the burner.

The plant may comprise a condenser through which pyrolysis gases and vapours may be drawn from the pyrolyser to condense and capture organic components of the pyrolysis vapours.

In one embodiment the heat source may be arranged to provide a pyrolysis temperature to maximise the yield of oil. In one example this comprises the heat source providing a pyrolysis temperature between 350° C. and 650° C.

In an alternate embodiment the heat source may be arranged to provide a pyrolysis temperature sufficient to cause torrefaction of the biomass. As an example the heat source may be arranged to provide a pyrolysis temperature of below 320° C.

In one embodiment the plant may be arranged to condense organic vapour generated by the pyrolysis on char generated by the pyrolysis to produce an oil/char mixture or slurry.

In one embodiment the plant is part of a combustion or gasification system having a combustor or gasifier, the plant being arranged to feed products generated by the pyrolysis of the feedstock as a fuel to the combustor or gasifier. This embodiment may also comprise providing heat generated by the combustor or gasifier as a or the source of heat for the pyrolysis.

In one embodiment the plant may be arranged to feed products generated by the pyrolysis of the feedstock to a boiler or gasifier as a co-firing fuel.

In one embodiment the plant may comprise a hopper for supplying the feedstock to the machine, the hopper being provided with an agitation mechanism capable of a combined rotational motion about an axis and linear reciprocation motion along the axis to facilitate a flow of the feedstock from the hopper to the machine. In one example this comprises the heat source providing a pyrolysis temperature between 350° C. and 650° C.

BRIEF DESCRIPTION OF THE DRAWINGS

Embodiments of the present invention will now be described by way of example only with reference to the accompanying drawings in which.

DETAILED DESCRIPTION OF PREFERRED EMBODIMENTS

In its broadest form, embodiments of the present method and system of grinding and pyrolysis of particulate carbonaceous feedstock comprise subjecting particulate carbonaceous feedstock to simultaneous particle size reduction and pyrolysis. The present embodiments are described in the context of particulate biomass feedstock, however embodiments may be applied to or operable in relation to other forms or types of carbonaceous feedstock. Pyrolysis has the effect of forming a layer of char on a biomass particle and producing organic vapours. A particle size reduction process breaks the char layer from a biomass particle thereby reducing the size of that particle and exposing a relatively fresh outer layer of the particle. Pyrolysis of the reduced size biomass particle again results in the formation of a char layer on the newly exposed outer surface and further production of organic vapour. This char layer is broken off by the particle size reduction process. Thus the pyrolysis assists the particle size reduction process by formation of a char layer which is relatively brittle, i.e. more grindable than the original biomass, and thus more easily removed in the particle size reduction process. Due to the particle size reduction process, sequential relatively "fresh" layers of a biomass particle are exposed directly to the pyrolysis process thereby enabling pyrolysis to occur to the very core of a biomass particle and sequential layers at a rapid rate. It is believed that this also results in generation of maximum volumes of organic vapours, thereby increasing the overall bio-oil yield. Depending on the structural features of biomass, the fragmentation of pyrolysing biomass particles may take place in a more random fashion than described above.

Figure 1:
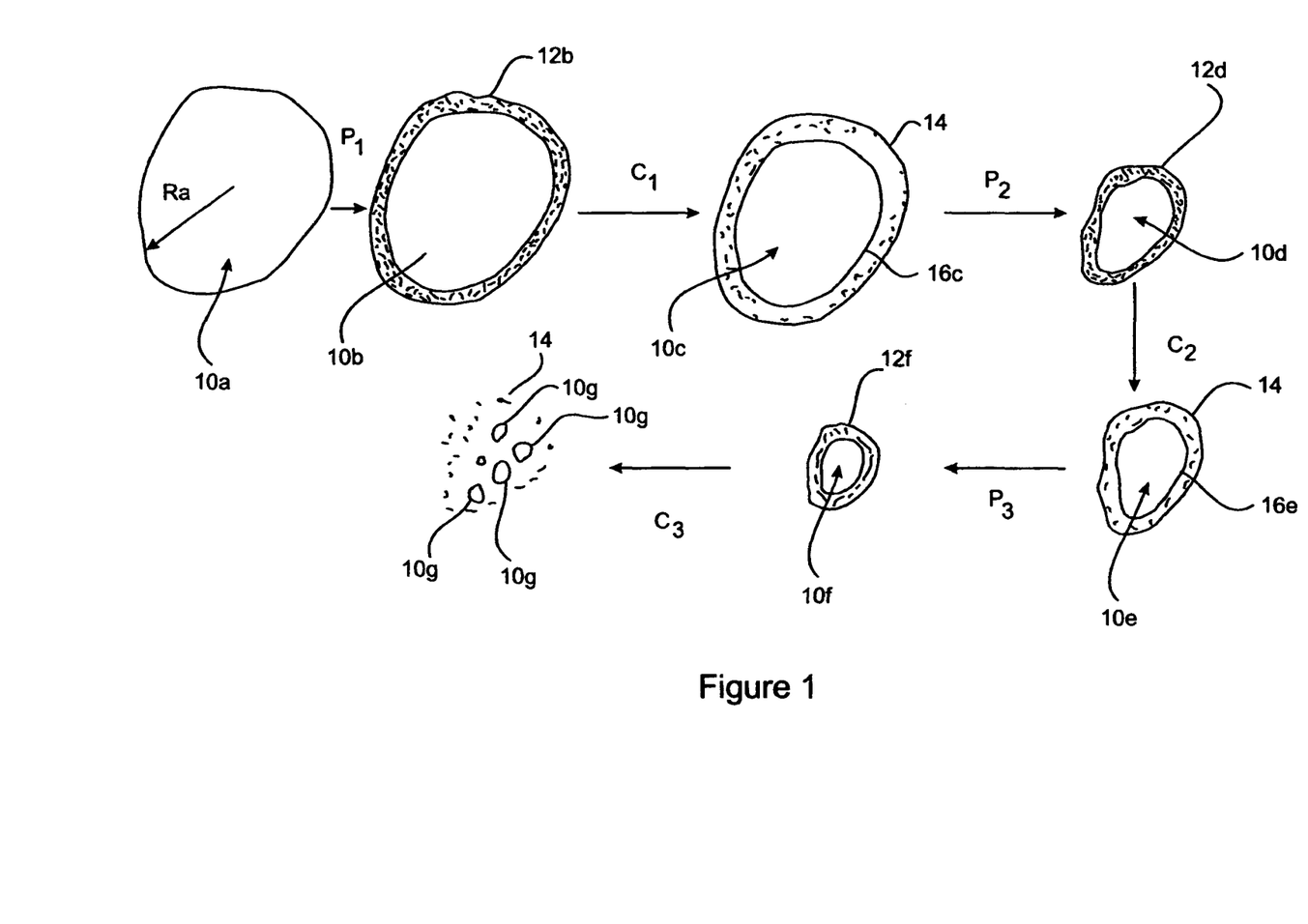
FIG. 1 is a schematic representation of the effect on a carbonaecous feedstock particle of an embodiment of the present method and system of processing particulate carbonaceous feedstock.

FIG. 1 is a conceptual illustration of the above described embodiment of the method and system for simultaneous grinding and pyrolysis of particulate biomass feedstock. A hypothetical biomass feedstock particle 10a of spherical shape and radius $R_a$ is shown prior to processing. While in practice particle size reduction and pyrolysis occur simultaneously, for ease of description in this Figure, the effect of these two processes are shown separately. When particle 10a is initially subject to pyrolysis P1, a char layer 12b is formed about the particle to form processed particle 10b. The particle 10b is subjected to particle size reduction process C1. This has the result of breaking off the char layer 12b and forming processed particle 10c. The char layer 12b is broken into finer char particles 14. As a result of particle size reduction process C1, particle 10c now has a relatively fresh or uncharred outer surface 16c. Pyrolysis continues at step P2 resulting in the surface 16c undergoing pyrolysis and forming a char layer 12d. The char layer 12d commences from the outer surface 16c and extends radially inwardly forming processed particle 10d. Particle size reduction process C2 results in the char layer 12d being broken off forming further fine char particles 14 and creating a further processed biomass particle 10e having an outer surface 16e which is newly exposed to the pyrolysis process. Pyrolysis process P3 creates yet a further char layer 12f and processed particle 10f. Particle size reduction process C3 results in the char layer 12f being broken off and forming further fine char particles 14. A kernel of processed particle 10f is now of a size where the size reduction process C3 breaks the remaining particle 10f into multiple smaller particles 10g each of which may now be completely pyrolysed. The pyrolysed particles 10g are again subject to the particle size reduction process and broken up into additional fine char particles 14. Concurrent with the above process is the production of pyrolysis gas including organic vapour. Note that the particle may fragment at any stage of the impacting and grinding process.

As described in greater detail below, embodiments of the method and system utilise a machine or apparatus in which both the particle size reduction process and pyrolysis occur simultaneously. This machine or apparatus uses one or more hard objects to contact and more particularly repeatedly impact the particulate biomass while the biomass is subject to pyrolysis. The hard objects may be either fixed within the machine or apparatus such as in a hammer mill, or may be separate and freely moveable such as in a ball mill. In either instance, pyrolysis is achieved by transferring heat to the biomass while it is being contacted by the hard objects. Heat transfer may be by pre-heating the objects themselves which contact the biomass, or heating the machine or apparatus externally in which the particle size reduction occurs, or a combination of both. When the particle size reduction is effected by use of separate and freely moving objects such as balls in a ball mill, heat transfer may be effected by heating the objects prior to them coming into contact with the biomass, and circulating the objects through the machine or apparatus in which the particle size reduction and pyrolysis occur. It is further envisaged that heat required for the pyrolysis process is generated at least in part by the burning of non-condensable gases produced by the pyrolysis process. Further embodiments envisage drying of the biomass prior to simultaneous particle size reduction and pyrolysis process. The drying may be effected by using waste heat from the heating of the objects.

Figure 2:
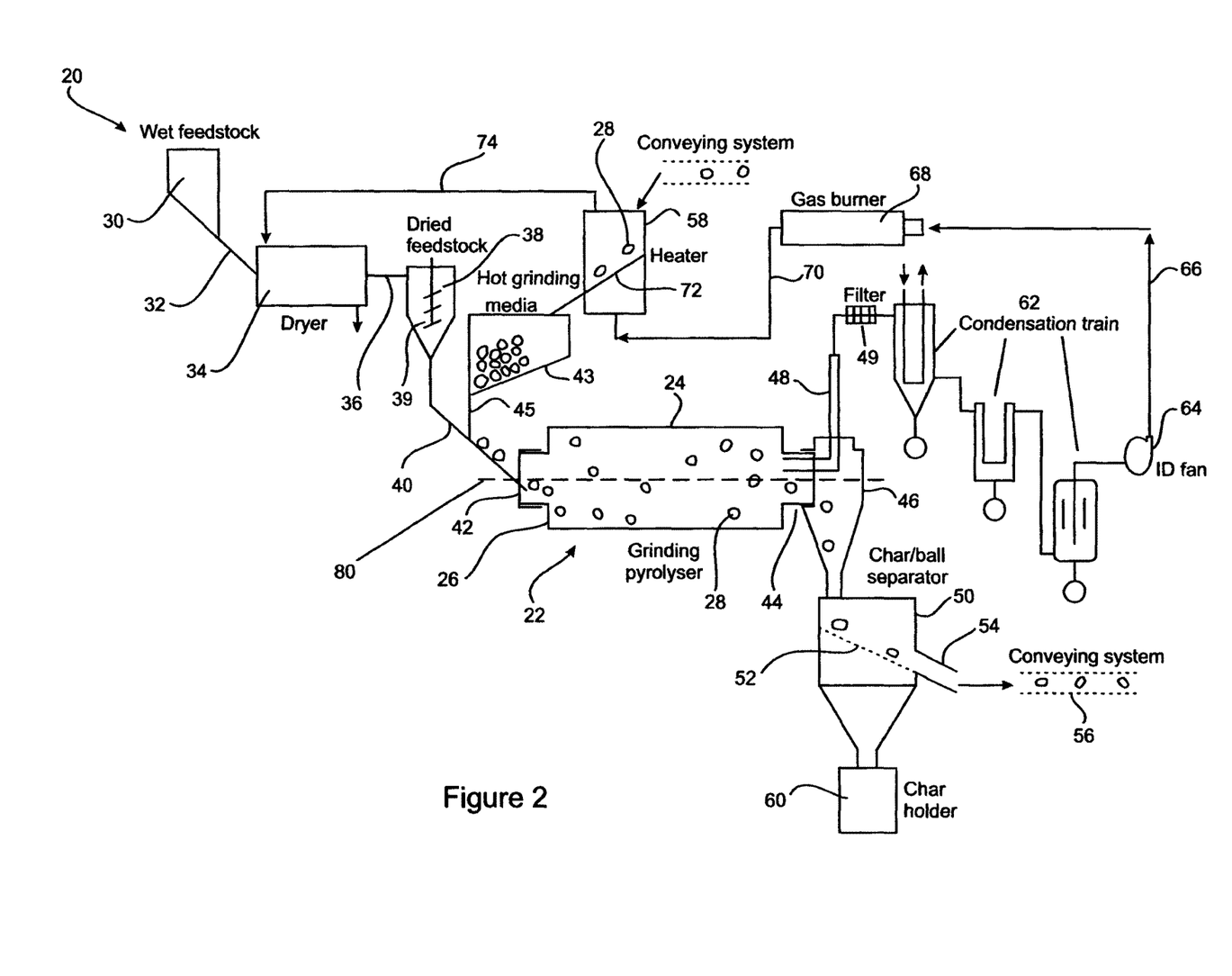
FIG. 2 is a schematic representation of one embodiment of a system and method for processing particulate carbonaceous feedstock in accordance with the present invention.

FIG. 2 illustrates one embodiment of a plant 20 and associated method for simultaneous grinding and pyrolysis of particulate biomass. Plant 20 comprises a grinding pyrolyser 22, being a machine or apparatus in which both particle size reduction and pyrolysis occur simultaneously. In this particular embodiment, the grinding pyrolyser 22 comprises a ball mill 24 having a rotatable vessel or drum 26. Ball mill 24 also comprises a plurality of hard objects in the form of balls 28 which together constitute the grinding media. As explained in greater detail later, the grinding media 28 may circulate through the ball mill 24.

Plant 20 also comprises a bin (hopper) 30 for holding wet particulate biomass feedstock. The term "wet" in the present context is intended to mean that the feedstock contains a relatively high moisture content rather than that the feedstock is covered in or otherwise bears surface water. The biomass particulate feedstock may for example be in the form of wood chips. Chute 32 leads from the bin 30 to a biomass dryer 34. The biomass feed stock may have a high moisture content, e.g., up to around 60%. The purpose of dryer 34 is to reduce moisture content of the feedstock as low as possible, e.g., to below about 10%. The temperature of a heating medium used in dryer 34 is controlled so that the biomass feedstock does not undergo any significant thermochemical reactions (i.e. pyrolysis) in the dryer 34.

Dried feedstock is conveyed from dryer 34 via line 36 to a dried biomass feedstock hopper 38. Dried feedstock is fed from hopper 38 into a chute 40 which leads to an inlet trunnion 42 of grinding pyrolyser 22.

Heated balls 28 from a hopper 43 can enter the chute 40 via conduit 45. Thus particulate biomass is able to mix with heated balls 28 in the chute 40, with the mixture fed to the inlet trunnion 42.

A discharge trunnion 44 of grinding pyrolyser 22 leads to particle collector 46, which could take the form of a cyclone. A mixture of char and balls 28 is discharged from the trunnion 44 into particle collector 46 and subsequently into a char/ball separator 50. Separator 50 is provided with a screen 52 having a mesh size arranged so that the balls 28 run down mesh 52 to a discharge chute 54 and directed to a conveyor system 56 which conveys the balls 28 to a heater 58. On the other hand, char passes through the mesh 52 and is collected in a char holder 60 located at the bottom of the separator 50.

Pyrolysis gas and vapours produced in the grinding pyrolyser 22 are collected via conduit 48, e.g. by applying a relative negative pressure (i.e. vacuum). In order to prevent condensation of the pyrolysis vapours, the conduit 48 is heated for example by use of heating tapes to a temperature of at least 300° C. and preferably above 400° C. The pyrolysis gases and vapours drawn via conduit 48 are processed through a condensation train 62 which operates to condense and capture organic components. As a considerable amount of fine char (e.g. smaller than 30 microns in size) is also drawn via conduit 48, the vapour should pass through a filtering device 49 prior to entering the condensation system. Any number of known condensation techniques such as, but not limited to: cooling for example using water or dry ice; or, electrostatic precipitation, may be applied to capture the organic components of the pyrolysis vapours.

Non-condensable gases and/or vapours of the pyrolysis products such as carbon dioxide, carbon monoxide, hydrogen and various light hydrocarbons are directed, e.g. by fan 64, through conduit 66 to a gas burner 68. The gases and/or vapour which are combustible are burnt in the gas burner 68 generating heated gas which is fed via conduit 70 to the heater 58. Alternately or additionally some of the char may be burnt to provide additional heat for the process if required. Hot gas flows from conduit 70 vertically upwardly through heater 58 across packed balls 28 lying on an inclined grid 72. When it is desired to maximize oil yield the heater 58 heats or reheats the balls 28 to a pyrolysis temperature of typically between 350° C. and 650° C. above. The waste hot gas subsequently flows via conduit 74 to the dryer 34. Thus waste heat from heater 58 is utilised in dryer 34 to reduce moisture content of the biomass feedstock. In an alternate embodiment the heater 58 may be arranged so that rather than using inclined grid 72, the balls 28 may be discharged vertically from the bottom of heater 58. Further the hot gas used for heating the balls 28 may be introduced so as to flow in directions other than or at least in addition to vertically. Conveying system 56 is insulated to reduce heat loss of the balls 28 as they are circulated from the separator 50 back to the heater 58.

A typical operating sequence of plant 20 together with typical operating parameters will now be described. Biomass feedstock is initially held (which may be continuous in commercial applications) in bin 30 and subsequently transferred via chute 32 to dryer 34. In dryer 34 the biomass is dried, e.g., to a moisture content of around or below 10%, by hot gases passing through conduit 74, constituting waste heat from heater 58. Dried biomass is transferred to hopper 38 and subsequently fed through chute 40 to inlet trunnion 42 of grinding pyrolyser 22. The feedstock may have poor flow characteristics and/or could bridge and thus block the outlet of hopper 38. In order to prevent this from happening an agitation mechanism in the form of a stirrer 39 may be installed in the hopper 38. The stirrer 39 is in the form of a central shaft with radial extending spikes and moves with a combined rotational motion about its axis and linear reciprocating along its axis. This motion of stirrer 39 has been found to be helpful in the feeding of crude biomass feedstock. Heated balls 28 discharged from hopper 43, mix with the biomass feedstock in the chute 40 prior to entering the grinding pyrolyser 22. Balls 28 may typically have a diameter ranging from about 10 mm to 120 mm and may be made from various materials including steel and silica. Balls 28 are provided with the biomass feedstock in a desired mass ratio (for example between six and ten) depending on pyrolysis temperature, which is typically about 350° C. to 650° C., as well as temperature of the balls 28 after reheating. The inside surface of inlet trunnion 42 is lined with spirals similar to an auger which assists in bringing the biomass feedstock and balls 28 to the vessel 26. A motor (not shown) operates to rotate vessel 26 of grinding pyrolyser about a central longitudinal axis 80. As the vessel 26 rotates, it picks up the balls 28 as well as biomass to produce a tumbling effect. The lifting of the balls 28 imparts momentum to the balls 28 which on falling repeatedly impact the biomass. Heat is also transferred to the biomass via contact with the previously heated balls 28. By ensuring a substantially oxygen free atmosphere within grinding pyrolyser 22, the heat transferred to the biomass causes pyrolysis of the biomass.

As explained above in relation to FIG. 1, the combined actions of the repeated impacts on the biomass particles by the balls 28, as well as the heat transfer cause simultaneous particle size reduction and pyrolysis of the biomass particles so that the biomass particles are progressively reduced in size to produce char and pyrolysis gases and vapours.

Vessel 26 is rotated at a speed below a critical speed (CS) at which biomass feedstock and the grinding media 28 in effect "stick" to an inside surface of the vessel 26 due to centrifugal force. $CS=(42.3 \div D^{0.5})$ rpm where D is the internal diameter of the vessel 26 in meters. It is believed that a useful speed range for the vessel 26 is between 0.55 CS and 0.9 CS. In this range, it is believed, in some circumstances, that a speed of 0.75 CS produces particularly good results. These speeds are believed to be useful in lifting the balls 28 to a height to generate maximum momentum prior to falling back onto the feed stock. The biomass feedstock is thus mixed with and ground/crushed by the balls 28 as a result of rotation of vessel 26.

Balls 28 may be made of steel, flint, pebble, silica, or other material. The balls 28 may occupy between 10% and 50% of the volume of the vessel 26. In one example, it is believed that a ball 28 occupancy of no more than 35% of the volume of the vessel 26 provides good results. This volume is the volume of the balls 28 in the vessel 26 at any one time. Thus in the plant 20 where the balls 28 are circulated, the circulation rate is arranged to provide a ball occupancy in terms of percentage of volume of vessel 26 in accordance with the above stated ranges.

The size of the balls 28 need not be uniform for all of the balls. For example, balls 28 may arrange in size from 10 mm to 120 mm in diameter. Further, it is possible to partition the grinding pyrolyser 22 into two or more compartments with larger balls 28 occupying compartments closer to the inlet trunnion 42 where particle size of the biomass feedstock is largest, with balls 28 of smaller diameter located in a compartment closer to the outlet trunnion 44 where particle size of the biomass is smaller. Thus the larger balls 28 impact on the larger particles of biomass feedstock, and as the particle size of the feedstock becomes smaller toward the discharge trunnion 44, more efficient size reduction is achieved by using balls 28 of smaller diameter. In the event that partitions and balls of different size are used, the partitions are formed of grids to allow particles of progressively smaller size to move from compartment to compartment toward the discharge trunnion 44.

In the event that the pyrolyser 22 comprises a single compartment, which may be beneficial in the case of a plant 20 shown in FIG. 2 with a continuous circulation of balls 28, a discharge end of the pyrolyser 22 may be tapered, with a smallest diameter portion of the taper connecting to the discharge trunnion 44. To assist the discharge of balls 28 and char, spiral liners may be fixed to an internal surface of the discharge trunnion 44. However other mechanisms and systems to facilitate discharge of balls 28 and char may be provided such as increasing the diameter of the outlet trunnion 44, and tilting the rotating vessel 26 to the horizontal, for example by one or two degrees.

To protect the inside surface of the pyrolyser 22/vessel 26, the internal surface may be covered by a liner composed of individual plates. The liners may be made from various materials and indeed may be matched to the material from which the balls 28 are made.

Mixed grinding balls 28 and char discharged through the discharge trunnion 44 are separated on the basis of different size and density (i.e. by virtue of different physical characteristics). In this example, the mixture is deposited onto an inclined grid 52 which allows char to pass therethrough to the holder 60 while the balls 28 are directed to the conveyor system 56. To assist the separation of the balls 28 from the char, the grid 52 may be vibrated or shaken.

Figure 3:
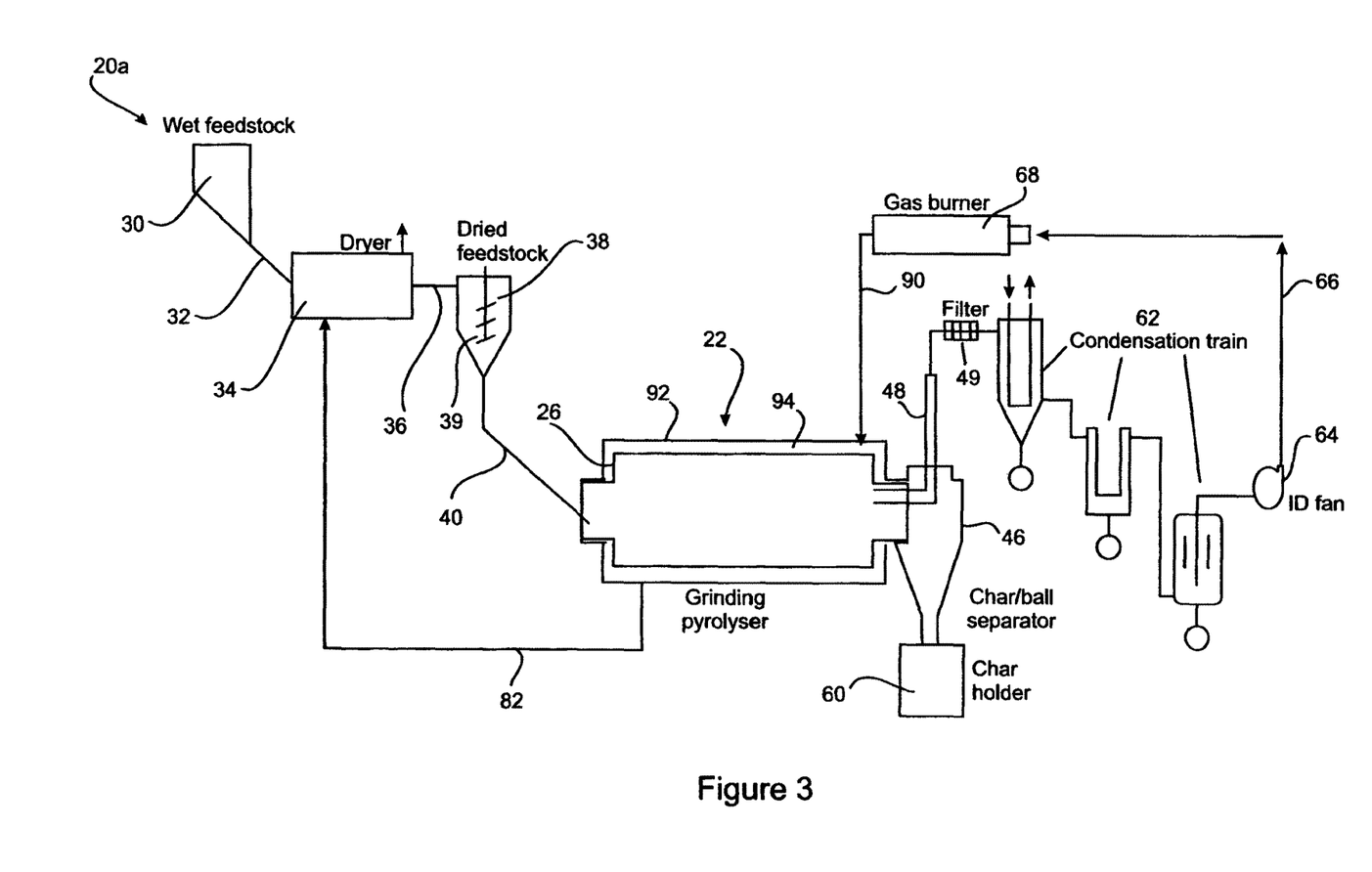
FIG. 3 is a schematic representation of a second embodiment of a method and system of processing particulate carbonaceous feedstock in accordance with the present invention.

FIG. 3 illustrates a second embodiment of a plant 20*a* for simultaneous grinding and pyrolysis of particulate biomass. In the description of this embodiment, the same reference numbers are used to describe or denote the same features as described above in relation to the plant 20 shown in FIG. 2. In a broad sense, the main difference between the plant 20 of FIG. 2 and plant 20*a* of FIG. 3 is that in plant 20*a* the grinding media (i.e. grinding balls 28) are not circulated, rather are maintained within the pyrolyser 22. This avoids the need for the conveying system 56, heater 58 and storage bin 43.

Also, as the balls 28 are retained within the pyrolyser 22, the separator 50 external to the pyrolyser is not required. In this embodiment vessel 26 is housed in an insulated outer jacket 92 creating an annular gap or space between the vessel 26 and the jacket 92. Heated gas is directed via line 90 into the gap 94. Pyrolysis is affected by transfer of heat from the hot gas in gap 94 through walls of the vessel 26. To maximise the yield of oil, the temperature inside the pyrolyser 22 should be about 350° C. to 650° C. As the heat for pyrolysis is transferred across the walls of pyrolyser 22/vessel 26, the walls are heated to a temperature higher than required for pyrolysis to account for heat transmission and loss through the walls of the vessel 26. For example the walls should be constructed to withstand temperatures in the order of about 500° C. to 850° C. or more. Another difference with plant 20a in comparison with plant 20 is that waste gas exiting the gap 94 surrounding the grinding pyrolyser 22 is channelled by conduit 82 to the dryer 34.

It is possible to vary the operating condition or post-processing method in order to satisfy particular product requirements. For example, operating the pyrolyser 22 at a lower temperature (e.g., from about 200 to 320° C.) enables the production of torrefied biomass. The pyrolysis process in this temperature range is known as torrefaction, and the resulted biomass may be densified into briquettes or pellets using conventional densification equipment. In this process, the condensation steps shown in FIGS. 2 and 3 may be omitted, and the pyrolysis vapours and burnable gases may be used as a heating source for the pyrolyser.

Lowering the filtration rate of the filtering device 49 in FIGS. 2 and 3 or omitting the filtering device altogether results in the organic vapour condensing on char fines producing a bio-oil/char mixture in the form of a bio-slurry or bio-paste. This bio-oil/char mixture may be used as combustion or gasification fuels.

Figure 4:
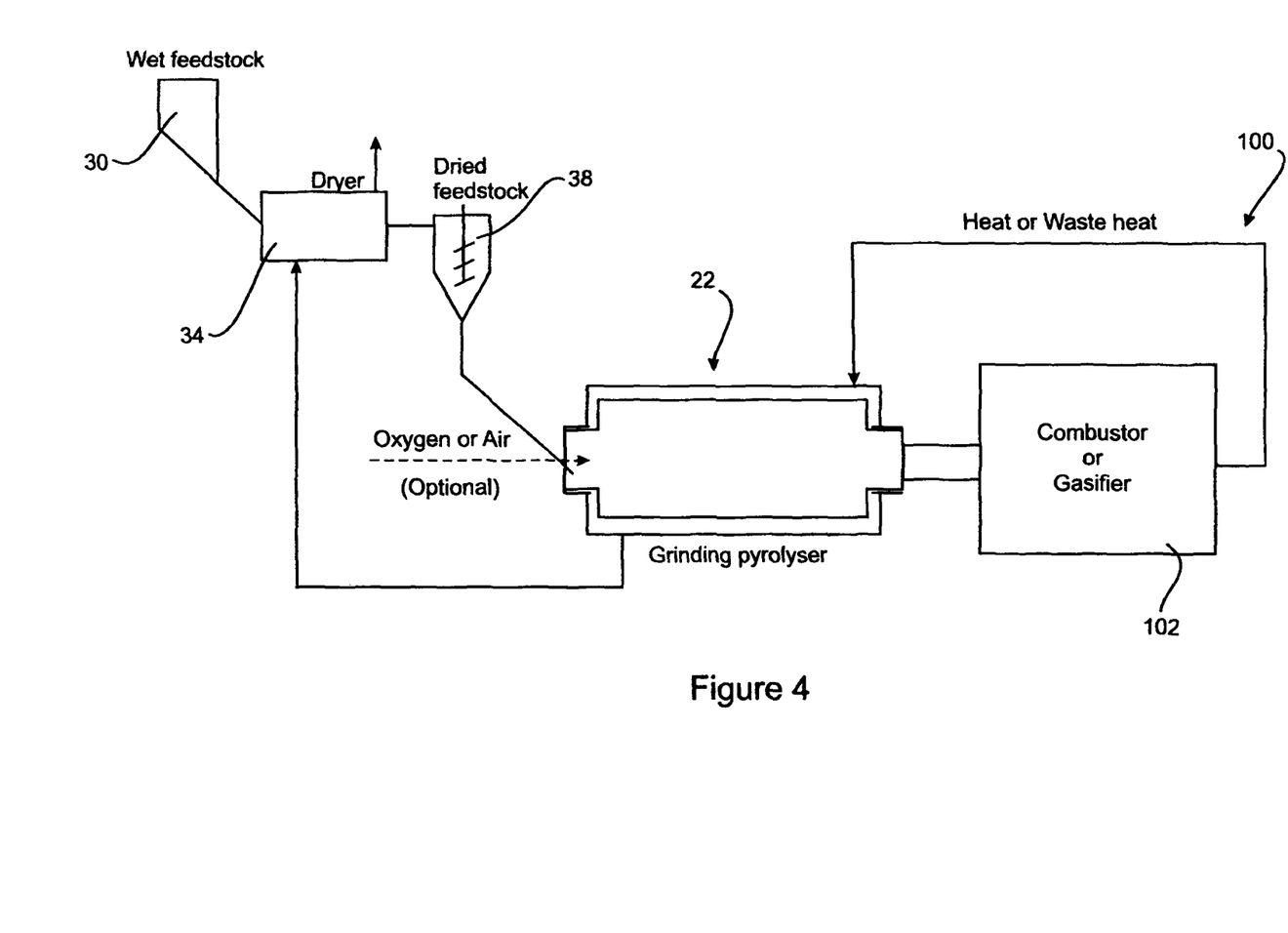
FIG. 4 is a schematic representation of a third embodiment of a method and system of processing particulate carbonaceous feedstock in accordance with the present invention.

Further, the pyrolyser itself may form part of a combustion or gasification system 100, as shown in FIG. 4. In this embodiment the volatiles and fine char produced by pyrolyser 22 is directly fed to a combustor or gasifier 102 of system 100. Part of the heat generated by the combustor or gasifier and/or the waste heat from the combustor or gasifier may be used to heat the pyrolyser. Alternatively, the pyrolysis heat may be provided by burning a small portion of the volatiles and/or fine char in the pyrolyser by introducing a small amount of oxygen or air into pyrolyser 22.

A deviation from the embodiment in FIG. 4 is that the pyrolysis products containing volatiles, char and burnable gases are fed into a boiler or gasifier as a co-firing fuel. This is advantageous over using fresh biomass as a co-firing fuel due to the omission of any biomass milling processes which are energy-intensive. In this case, the pyrolysis heat may again be provided by burning a small portion of the volatiles and/or char in pyrolyser 22. This can be achieved by introducing a small amount of oxygen or air into pyrolyser 22 and monitoring the temperature inside the pyrolyser. Alternatively, some hot flue gas from the boiler or gasifier may be used as a heating source for the pyrolyser.

It is believed that embodiments of the present invention provide various benefits and/or advantages over current pyrolysis techniques. These include the ability to use crude feedstock particles having a wide particle size distribution (for example between 5 mm and 8 cm in thickness or diameter), irregular shape (e.g. non-spherical, highly branched) and containing non-biomass particles such as stones and sand. The present invention enables use of substantially raw feedstock without the need for substantive and costly preliminary processing. An added advantage is that the char produced in the pyrolyser of this invention is in the form of fine particles (predominantly under 50 microns in diameter), rendering the char readily usable (e.g. as a fuel or soil improver). Also as no carrier gas is required, thermal quenching of pyrolysis vapours is simplified, generation of aerosols is reduced. There may also be a more efficient use of non condensable pyrolysis gas.

Now that embodiments of the present invention have been described in detail it will be apparent to those skilled in the relevant arts that numerous modifications and variations may be made without departing from the basic inventive concepts. For example, FIGS. 2 to 4 illustrate plants for the simultaneous grinding and pyrolysis of biomass feedstock which incorporate a ball mill. However other types of machines capable of reducing the particle size of biomass may be used such as a hammer mill or a reciprocating jaw crusher. Also, heat for pyrolysis may be provided by a combination of heating the grinding media (i.e. the balls 28) as shown in FIG. 2, and directly heating the inner wall/vessel 26 of the pyrolyser as shown in FIG. 3. Further, natural gas or other fuels may be used to augment the fuel supply for the burner 68 if required. All such modifications and variations together with others that would be obvious to persons of ordinary skill in the art are deemed to be within the scope of the present invention the nature of which is to be determined from the above description and the appended claims.

The invention claimed is:

1. A fast pyrolysis method of processing biomass feedstock to produce at least liquid bio-oil, the method comprising:

feeding biomass feedstock comprising at least biomass particles with thicknesses or diameters between approximately 2 cm and 8 cm to a vessel having an inner diameter D meters;

rotating the vessel at a speed between 55% and 90% of a critical speed (CS) to facilitate the fast pyrolysis, wherein: $CS=42.3/D^{0.5}$ rpm;

while the vessel is rotating at the speed between 55% and 90% of CS, simultaneously:

(a) subjecting the biomass feedstock fed into the vessel to a particle size reduction process, which comprises repeatedly contacting the biomass feedstock with a plurality of separate and freely movable hard objects; and (b) pyrolysing the biomass feedstock to produce volatiles and solid char particles, at least some of the volatiles being condensable to form the liquid bio-oil;

discharging at least some of the volatiles through an outlet of the vessel; and condensing at least some of the volatiles to form the liquid bio-oil.

2. The method of claim 1, comprising discharging a mixture of at least a portion of the solid char particles and the volatiles through the outlet of the vessel.

3. The method of claim 2, wherein discharging the mixture comprises entraining the char particles with the volatiles produced by the pyrolysis.

4. The method of claim 1, wherein pyrolysing the biomass feedstock comprises transferring heat from the plurality of separate and freely movable hard objects to the biomass feedstock by conduction and convection.

5. The method of claim 4, wherein heat transferred from the plurality of separate and freely movable hard objects to the biomass feedstock for the pyrolysis is generated by one or both of:
heating the plurality of separate and freely movable hard objects prior to the objects coming into contact with the feedstock; and
heating the vessel externally.

6. The method of claim 5, comprising generating heat for the pyrolysis by feeding non-condensed volatiles and/or char produced by the pyrolysis to a burner via a feed system, and burning the non-condensed volatiles and/or char therein.

7. The method of claim 1, comprising providing limited oxygen into the vessel to enable partial combustion of the volatiles and/or char to generate heat for the pyrolysis of the feedstock.

8. The method of claim 1, comprising conducting pyrolysis at a temperature sufficient to cause torrefaction of the feedstock.

9. The method of claim 1, wherein condensing at least some of the volatiles to form the liquid bio-oil comprises condensing the volatiles generated by the pyrolysis on char generated by the pyrolysis to produce a bio-oil/char slurry.

10. The method of claim 9, further comprising using the bio-oil/char slurry as a combustion or gasification fuel.

11. A hybrid combustion or gasification system arranged to use a source of renewable energy as fuel, the system comprising:
a pyrolysis plant for simultaneous particle size reduction and pyrolysis of biomass feedstock comprising at least biomass particles with thicknesses or diameters between approximately 2 cm and 8 cm, in order to produce the source of renewable energy, the pyrolysis plant comprising:
(a) a machine capable of subjecting the biomass feedstock to the simultaneous particle size reduction and pyrolysis, the machine comprising:
i. a rotating vessel capable of rotating at a speed of between 55% and 90% of a critical speed (CS), wherein: $CS=42.3/D^{0.5}$ rpm, where D is the internal diameter of the vessel in meters; and
ii. a plurality of separate and freely movable hard objects disposed in the vessel, the hard objects being of sufficient hardness to break off a char layer formed on the biomass feedstock due to pyrolysis, to thereby effect particle size reduction of the biomass feedstock when the vessel rotates;
(b) a heat source capable of causing pyrolysis of the biomass feedstock while subjected to the particle size reduction in the rotating vessel;
wherein the operation of the machine and the heat source cause the pyrolysis plant to produce, as the source of renewable energy, solid char particles and volatiles condensable to form the liquid bio-oil;
a combustor or gasifier downstream of the pyrolysis plant, the combustor or gasifier arranged to be fuelled by at least a source of non-renewable energy;
a feed system operatively connected between the pyrolysis plant and the combustor or gasifier, the feed system arranged to feed at least some of the volatiles and/or liquid bio-oil and/or solid char particles produced by the pyrolysis plant as a co-firing fuel to the combustor or gasifier.

12. The system of claim 11, wherein heat generated by the combustor or gasifier is a or the source of heat for the pyrolysis.

13. The system of claim 11, wherein the heat source is arranged to provide a pyrolysis temperature in a range that causes torrefaction of the biomass.

14. The system of claim 11, comprising a hopper operatively connected to the machine for supplying the feedstock to the machine, the hopper being provided with an agitation mechanism capable of a combined rotational motion about an axis and linear reciprocation motion along the axis to facilitate a flow of the biomass feedstock from the hopper to the machine.

* * * * *